No. 620,752. Patented Mar. 7, 1899.
L. J. DORENFELDT.
APPARATUS FOR RECOVERING CHEMICALS FROM SULFITE LIQUORS.
(Application filed Oct. 3, 1898.)
(No Model.)
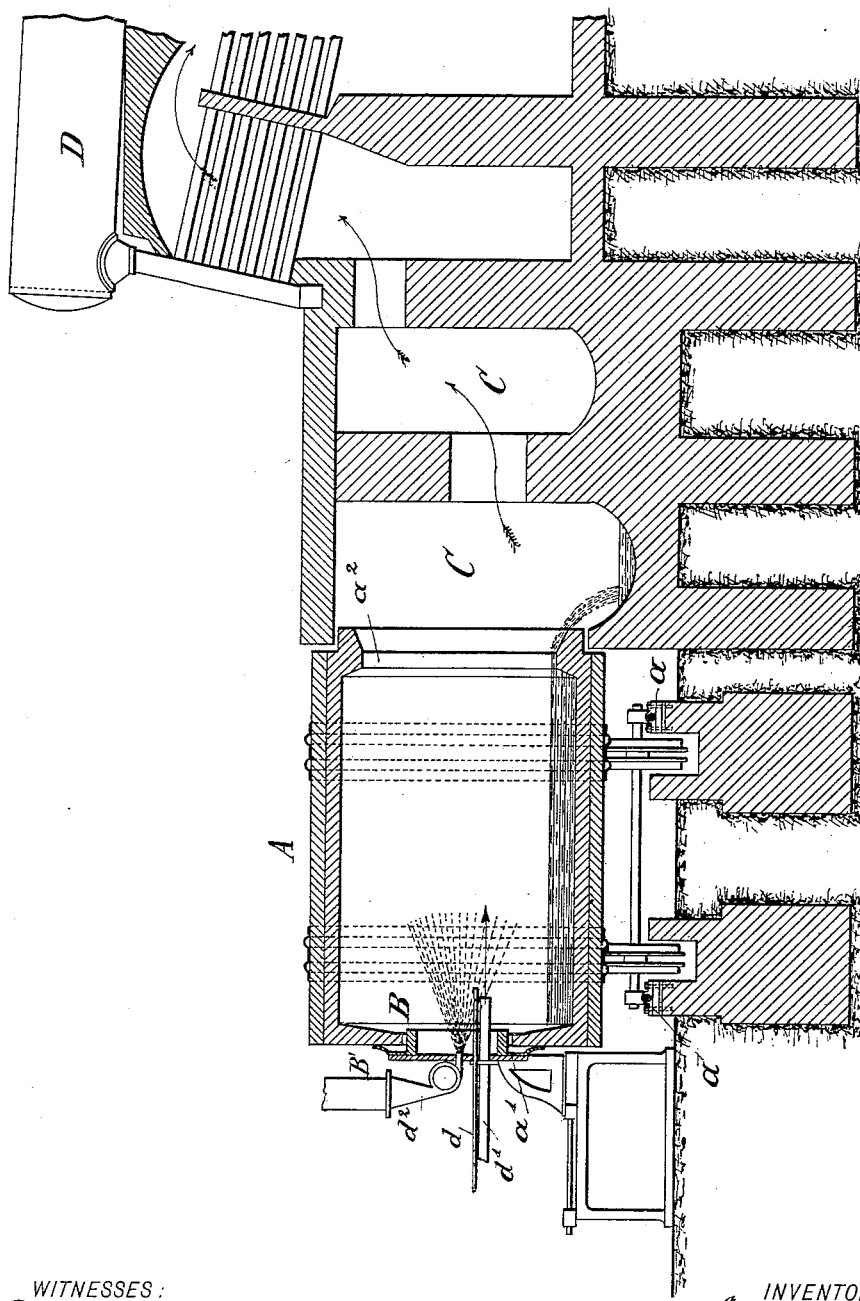
WITNESSES:
INVENTOR
Lauritz J. Dorenfeldt
BY
ATTORNEYS.

UNITED STATES PATENT OFFICE.

LAURITZ J. DORENFELDT, OF RHEINDUERKHEIM, GERMANY.

APPARATUS FOR RECOVERING CHEMICALS FROM SULFITE LIQUORS.

SPECIFICATION forming part of Letters Patent No. 620,752, dated March 7, 1899.

Application filed October 3, 1898. Serial No. 692,524. (No model.)

*To all whom it may concern:*

Be it known that I, LAURITZ J. DORENFELDT, a citizen of the Kingdom of Sweden and Norway, residing at Rheinduerkheim, in the Empire of Germany, have invented certain new and useful Improvements in Apparatus for Treating the Waste Liquors from Sulfite-Wood-Pulp and other Cellulose Mills and Utilizing Them as Fuel, of which the following is a specification.

In the treatment of waste cooking liquors of sulfite-wood-pulp and other cellulose mills and the burning of the residuum obtained by evaporating the same rotary furnaces were employed, in which the residuum is burned for the purpose of recovering the chemicals used in the cooking liquors of such mills. These rotary furnaces were more economical in the consumption of fuel, in repairs, and in their ease of manipulation and in operation than the stationary incinerating or calcining furnaces which were theretofore employed for the purpose of burning such residuums. The rotary furnace, however, was met by a very serious objection—namely, that as the same had to be for the sake of economy and for the prevention of offensive smells continuously rotated the chemical ashes obtained by the same do not leave the furnace in a fused condition, but in a coke-like state. This is very detrimental not only because the chemicals are thus rendered impure by fused or only partially-fused incrustations, which would necessitate a troublesome and expensive decanting and filtration, but because the use of such furnaces is even rendered impossible for many of the processes in such mills since they have to work at a melting temperature in order to insure the proper reaction of the chemicals. Thus, for instance, sulfite-pulp mills could not make use of such rotary furnaces, though in other respects they would be very advantageous, as the offensive smells from these mills could be better got rid of by the use of rotary furnaces than by any other means heretofore known.

The object of the present invention is to construct a rotary furnace or apparatus for treating waste concentrated liquors from sulfite-wood-pulp and other cellulose mills, in which the chemicals may be melted under continuous working; and the invention consists, therefore, of an apparatus for treating the waste concentrated liquors and burning them so as to retain the chemicals contained in the same for further use.

The accompanying drawing represents a vertical longitudinal section of my improved apparatus for treating waste liquors of wood-pulp mills and utilizing the same as fuel.

Similar letters indicate corresponding parts.

In the drawing, A represents a rotary furnace which is composed of a cylindrical chamber suitably lined and mounted on rollers $a$ or otherwise supported so as to be capable of rotation on its axis. The front wall of the cylindrical chamber A is provided with a central circular opening $a'$, in which is fitted a stationary flanged plate or casting B. Between the front wall of the chamber and the flanged plate an elastic connection or gasket $B'$ is arranged, so as to make the joint sufficiently air-tight to admit of rotation of the chamber. Through the plate B enters a pipe $d$ for admitting the waste concentrated liquor in the form of a spray; also, additional pipes $d'$ $d^2$ for admitting air and fuel, which latter may be coal-dust, petroleum, or the like for commencing the combustion and for assisting in maintaining the combustion when acquired. The opposite end of the cylindrical chamber A is provided with a contraction or throat $a^2$, which forms a circular opening that connects with the fixed or stationary chambers C, in the first chamber of which the fused chemicals are dropped, from which they may be drained off, either intermittently or continuously, by means of a suitable drainage or siphon channel. The hot gases of combustion are drawn through the chambers and conducted to the steam-boiler D or utilized for other heating purposes.

It was found by calorimetric tests that the incrustations contained in the waste liquors constituted by far the greater part of the combustible substance of the same. This was confirmed by a practical test in a paper-mill where a rotary furnace was kept burning for a week at a time without auxiliary firing. By using the concentrated waste liquors together with the air and fuel at the ingoing end of the rotary furnace the waste liquors and chemicals in the same are moved forward in the same direction as the gases obtained by the combustion, said gases attaining gradually a higher temperature as the combustion proceeds, and thus the temperature is much higher than is required for melting the chemicals, they leaving the furnace in a fused condition.

The furnace must further be so constructed that any desired inclination within certain limits may be given to it, so as to subject the chemicals in the furnace for the exact time required for reduction. When the production of the mill is small in proportion to the capacity of the furnace or when the chemicals require only a short time for reduction, then a greater inclination is to be given to the rotary furnace toward its outgoing end; but when the production of the mill is large or when the chemicals require a long time the inclination is reduced. In this manner it is possible to adjust a rotary furnace so that chemicals leave it in a pure and fused condition, while at the same time by the continuous working of the furnace the offensive smells from unburned gases—for example, those of which sulfur is a constituent and smells that would not be removed with intermittent working—are obviated without making special provision for this purpose.

Having thus described my invention, I desire to claim as new and to secure by Letters Patent—

An apparatus for burning the concentrated waste liquors of sulfite-wood-pulp and other cellulose mills, which consists of a rotary furnace provided with an opening in its front wall, a suitably-supported and stationary plate having an annular flange and extending into said opening, an elastic gasket arranged upon the flanged plate forming an airtight joint between the same and the end of the furnace, and pipes passing through said stationary plate for conducting the concentrated waste liquors, air and fuel into the furnace, substantially as set forth.

In testimony that I claim the foregoing as my invention I have signed my name in presence of two subscribing witnesses.

LAURITZ J. DORENFELDT.

Witnesses:
FRANZ STAAB,
HEINRICH VOIGT.